United States Patent [19]

Fayling

[11] B 3,927,393

[45] Dec. 16, 1975

[54] MAGNETIC RECORD MEDIUM AUTHENTICATION SYSTEM

[75] Inventor: Richard E. Fayling, White Bear Lake, Minn.

[73] Assignee: Minnesota Mining and Manufacturing Company, St. Paul, Minn.

[22] Filed: May 2, 1973

[21] Appl. No.: 356,602

[44] Published under the Trial Voluntary Protest Program on January 28, 1975 as document no. B 356,602.

[52] U.S. Cl. .................. 340/149 A; 360/39; 360/56

[51] Int. Cl.$^2$ ........................ G11B 5/02; G11B 5/09

[58] Field of Search... 340/149 A, 174 BB, 174 NA, 340/174 HA, 174 GA, 174.1 R; 179/100.2 A, 100.2 D, 100.2 MD, 100.2 S, 100.2 B; 346/74 M; 235/61.11 D; 360/39, 56

[56] References Cited

UNITED STATES PATENTS

| | | | |
|---|---|---|---|
| 3,200,207 | 8/1965 | Rainer et al. | 179/100.2 CH |
| 3,566,356 | 2/1971 | Holm et al. | 340/149 A |
| 3,573,981 | 4/1971 | Ahn et al. | 340/174 NA |
| 3,609,684 | 9/1971 | Lipp | 340/149 R |
| 3,626,160 | 12/1971 | Hagopian | 235/61.11 D |
| 3,714,664 | 1/1973 | Fayling | 346/74 M |
| 3,739,086 | 6/1973 | Heather | 179/100.2 S |

OTHER PUBLICATIONS

IBM Technical Disclosure Bulletin, Vol. 9. No. 11, Apr., 1967, pp. 1499, 1500, J. J. Hagopian.

*Primary Examiner*—Donald J. Yusko
*Attorney, Agent, or Firm*—Alexander, Sell, Steldt & Delahunt

[57] ABSTRACT

A system for authenticating a record medium. The record medium necessarily includes a magnetic recording layer containing uniformly dispersed magnetizable material having magnetic anisotropy wherein the material at a plurality of selected locations is differently aligned with respect to a reference location to provide a magnetically detectable permanent fixed information pattern such as a code pattern. The record medium is subjected to a magnetic field to cause the particles within the plurality of selected locations to be differently magnetized according to the alignment thereof. The differently magnetized selected locations are subsequently sensed to provide a signal representative of the plurality of selected locations. This signal is compared with a predetermined signal pattern to authenticate the record medium. The record medium may be repeatedly demagnetized to inhibit detection of the selected locations and remagnetized to enable such detection.

4 Claims, 5 Drawing Figures

MAGNETIC RECORD MEDIUM AUTHENTICATION SYSTEM

CROSS REFERENCE TO RELATED APPLICATIONS

This application is related to the copending applications of Richard L. Miklos and Jack E. Blackburn, entitled METHOD OF MAKING A MAGNETIC RECORD MEDIUM FOR USE IN INFORMATION PROCESSING SYSTEMS, U.S. Ser. No. 356,604, and MAGNETIC RECORD MEDIUM AND INFORMATION PROCESSING SYSTEM, U.S. Ser. No. 356,605, and the application of Richard E. Fayling and Douglas D. Campbell, entitled MAGNETIC SECURITY DOCUMENT AND METHOD FOR MAKING U.S. Ser. No. 356,603, all of which applications were filed on the same day as this application, i.e. May 2, 1973, and are assigned to the same assignee as this application.

BACKGROUND OF THE INVENTION

1. Field of the Invention

This invention pertains to magnetic recording, and especially to the adaptation of magnetic recording techniques for authenticating and interrogating magnetic record media.

2. Description of the Prior Art

The expanded use of credit cards, airline tickets, stock certificates and the like record media has created a great need for a system for authenticating such record media. Any scheme for authenticating such record media is inherently dependent upon the constituent elements of the media. Many such record media include magnetic recording material to enable recording of temporary data for subsequent machine processing, and to allow storage and retrieval of media authentication or other fixed information. A system for authenticating such a multi-purpose magnetic record medium is disclosed in U.S. Pat. No. 3,566,356. The record medium disclosed therein contains a layer or layers of a composite of magnetizable material having particular hysteretic response characteristics. Authentication is accomplished by comparing the signal response produced upon subjecting the record medium to a demagnetizing field with a predetermined range of signal values typical of the particular hysteretic response characteristics of the material. Record media useful in such an authentication system, however, require specially prepared magnetic materials.

SUMMARY OF THE INVENTION

The present invention provides a system for authenticating a novel type of record medium in which magnetically detectable fixed information, such as a code pattern, is permanently implanted in a manner precluding alteration of the fixed information pattern by conventional recording techniques. Certain embodiments of this novel type of record medium are described and claimed in the copending applications cross-referenced hereinabove the disclosure of which are incorporated herein by reference. This record medium characteristically has a magnetic recording layer containing uniformly dispersed magnetizable material having magnetic anisotropy, such as acicular particles of gamma $Fe_2O_3$ or platelets of barium ferrite. The magnetizable material at a plurality of selected locations is differently aligned with respect to the alignment of the magnetizable material at a reference location to provide the fixed information pattern. In the authentication system according to the present invention, a substantially unidirectional magnetic field is applied to the magnetic recording layer to differently magnetize the material depending upon the alignment thereof. The magnetization of the differently magnetized material is then sensed to provide a signal representative of the fixed information pattern. The signal is compared with a predetermined signal pattern to authenticate the record medium.

In an embodiment of the present invention adapted for authenticating a novel type of record medium wherein the selected locations are uniformly spaced, the record medium is traversed at a uniform velocity past a sensor device to cause an alternating signal to be produced. The frequency of this signal corresponds to the spacing of the uniformly spaced selected locations and the rate at which such locations are traversed. The authenticity of the record medium is established by comparing the produced alternating signal with a reference signal having a predetermined frequency.

In one aspect, the present invention also provides an information processing system for use with the novel type of record medium described hereinabove. The record medium used with this information processing system has fixed information permanently implanted in the recording layer in the form of a plurality of selected locations at which the magnetizable material is permanently aligned with respect to a reference direction to provide a detectable pattern representative of the fixed information. A digital information signal is recorded onto the recording layer to produce, as representative of temporary information, a pattern of remanently magnetized regions within the layer, superimposed on the plurality of selected locations representative of the fixed information. This superimposition causes the remanence within each region to be amplitude modulated by the magnetizable material alignment at the plurality of selected locations. When the record medium is traversed past a sensor device, an amplitude modulated digital signal is produced in which the amplitude modulation component represents the fixed information, and the digital component represents the temporary information.

DESCRIPTION OF THE PREFERRED EMBODIMENT

Figures 1, 2:
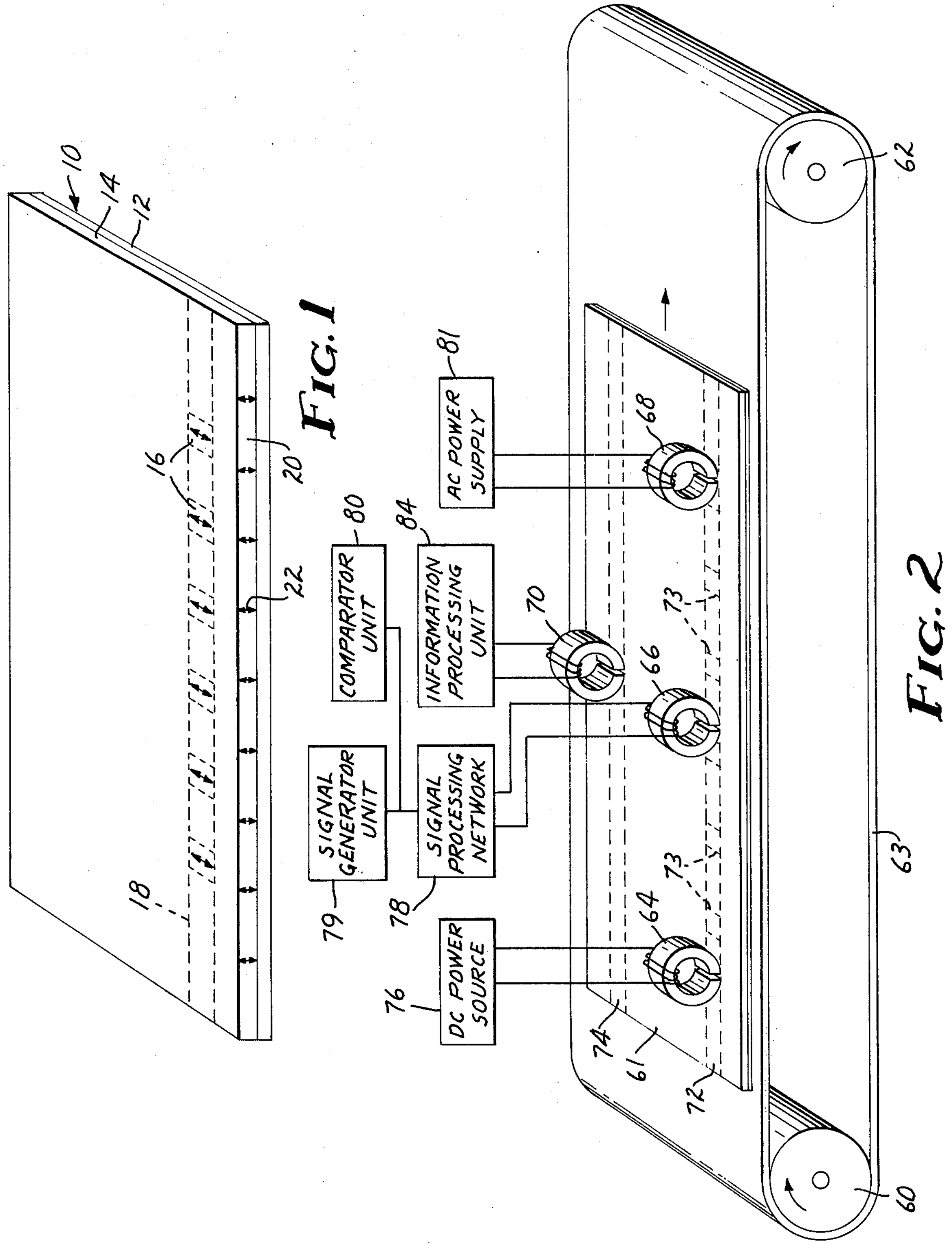
FIG. 1 is a three dimensional view of a record medium for use with the system of the present invention.
FIG. 2 is a combined three dimensional and schematic view of a system for authenticating a record medium such as is shown in FIG. 1.

FIG. 1 shows a three dimensional view of a record medium 10 for use in the present invention. Such a record medium is conveniently made following the disclosure in the above cross-referenced copending patent application of Richard E. Fayling and Douglas D. Campbell, U.S. Ser. No. 356,603. In the making of such a record medium, a sheet is first provided which comprises a nonmagnetic backing and a layer thereof of a substantially uniform dispersion of magnetically anisotropic magnetizable particles wherein the particles are temporarily free to rotate. The magnetizable particles at selected locations in the layer are caused to be differently aligned from the alignment of the magnetizable particles at a reference location, after which the particles are permanently immobilized to provide the permanent fixed information pattern. Visible indicia characteristic of an intended use of the security document are also applied to the sheet.

By uniformly dispersed, it is herein meant that the particle density, i.e. the number of particles per unit area, is approximately constant throughout the layer, even though the particles may be differently aligned at various locations. The particles within a plurality of selected locations are differently aligned with respect to a reference location, which may, for example, be along an edge of a record medium such as a security document. Anisotropic particles are readily magnetized in either direction parallel to their easy direction of magnetization and retain a higher level of remanent magnetization after having been magnetized with a given applied field than is retained after having been magnetized with the same applied field in a direction other than the easy direction.

Magnetic anisotropy in particulate magnetizable materials is most commonly associated with either shape anisotropy or crystalline anisotropy. For example, hexagonal ferrite materials such as barium ferrite are characterized by a high degree of crystalline anisotropy. Such materials are readily available in the form of minute platelets in which the crystalline anisotropy results in an easy direction of magnetization normal to the plane of the platelets. The platelets are readily aligned by mechanical and/or magnetic forces to have the plane of the platelets parallel to the surface of the layer. In such an event, the easy direction of magnetization would then be normal to the plane. The selected locations represent regions wherein the platelets are set on edge within the layer and rotated in a desired direction. The selected locations may be uniformly spaced in the layer to form a repetitive pattern which defines a permanent signal track from which a predetermined repetitive signal may be produced. Such a repetitive pattern is presented in the security document described hereinafter. Alternatively, the selected locations may be spaced at non-repetitive predetermined positions, with varying intervals therebetween or may be aligned in different directions. A predetermined non-repetitive signal may be produced representing the positions of the non-repetitive selected locations.

Another security document comprises a nonmagnetic backing, a recording layer and a printable layer upon which visible indicia are applied. The recording layer contains acicular particles of gamma-$Fe_2O_3$, uniformly dispersed within a flexible binder. The recording layer has background portions wherein the particles are uniformly aligned in one direction parallel to both the surface and to a long dimension of the document. Since shape anisotropy is paramount in gamma-$Fe_2O_3$ particles, the easy direction of magnetization is parallel to the long dimension of the particles. The easy direction of magnetization in the background portions is, therefore, also parallel to both the surface and to a long dimension of the document. The record layer also has additional portions representing selected locations within which the particles are further aligned, still parallel to the surface of the document, but also normal to the aligned particles within the background portions. The delineation between the portions and the selected locations may be thought of as an abrupt transition in the direction of alignment of the particles, but in actual practice, due to the normal divergence of magnetic flux, such transitions will generally extend over a distance dictated by the characteristics of the aligning magnetic field.

When the document has applied thereto a conventional recording field applied along the long dimension of the document, i.e. along the direction of alignment of the particles within the background portions, the particles within those portions will be readily magnetized and will retain a higher state of remanent magnetization then is produced within the selected locations where a direction other than the easy direction of magnetization is presented to the magnetizing field. Upon playback, a high amplitude signal will be produced corresponding to the background portions while a lower amplitude signal is produced corresponding to the selected locations.

The magnetic recording layers used in the security documents may conveniently be a stripe of conventional magnetic recording media formed, imbedded or affixed to a substrate such as a standard 30 mil. (0.76 mm) credit card stock. Such stock is readily obtained as 26 mil. (0.66 mm) thick sheets of 95 wt. % polyvinyl chloride—5 wt. % polyvinyl acetate. If desired, the printable layer may be eliminated by adding titanium dioxide pigment to the substrate composition to provide a printable surface. If further desired, an outer protective 2 mil. (0.051 mm) thick layer of 95 wt. % polyvinyl chloride—5 wt. % polyvinyl acetate may be heat-fused to the pigmented layer after the visible indicia has been applied thereto. The magnetic recording layers are typically formed of a mixture of the magnetizable material and a nonmagnetic flexible organic binder together with a suitable solvent which are coated onto the substrate and subjected to appropriate aligning magnetic fields. In a typical case, such a coating comprises a uniform dispersion of 65 wt. % gamma-$Fe_2O_3$ acicular particles (typically 500 nm long and 100 nm in diameter) and 35 wt. % thermoplastic polyurethane binder together with a suitable solvent. Other formulations may similarly be employed consistent with known magnetic recording media formulations.

In another embodiment, the recording layer contains minute platelets of barium ferrite uniformly dispersed within a flexible binder. The particles in the background portions are aligned parallel to the surface of the document such that the easy direction of magnetization thereof is perpendicular to the plane of the document, while the particles within the selected locations are aligned to have the particles turned on edge so that the easy direction of magnetization within the selected locations are parallel to the plane of the document. The greater anisotropy normally present in barium ferrite particles than is present in gamma-$Fe_2O_3$ acicular particles and greater ease with which the particles become aligned results in an even higher difference in the remanent magnetization resulting from applying a uniform magnetic field upon the magnetic recording layer.

Such security documents are preferably made with apparatus in which a nonmagnetic backing from a roll is passed beneath a coater within which is a dispersion of magnetizable anisotropic particles, binder and appropriate solvents. A coating is thereby applied to the backing. A section of the coating is then exposed to a magnetic field produced by an aligning device. In one embodiment, the aligning device is conveniently a section of a premagnetized polymer based permanent magnet material containing barium ferrite platelets such as manufactured by Minnesota Mining and Manufacturing Company under the trade name "Plastiform". This pemanent magnet material is described in U.S. Pat. No. 2,999,275, and may be preferably magnetized and positioned such that bands of oppositely magnetized material extend across the aligning device. When the coating is stationary adjacent the aligning device, the magnetizable particles become aligned with the magnetic fields in a manner to be hereinafter further described. The aligning device is thereafter removed to prevent smearing of the aligned particles as the backing and coating is then passed adjacent a heated bar to heat the coating and evaporate the solvent, thereby permanently immobilizing the magnetizable particles. The heated bar is conveniently electrically heated in a conventional manner. If desired, the aligning device may be left adjacent the backing and coating until the particles are permanently immobilized such as by heating, thereby preventing any inadvertent smearing of the aligned particles. After the particles are permanently immobilized, a printable layer containing visible indicia characteristic of an intended use of the document is affixed to the coating. The printable layer may conveniently be a section of pressure-sensitive adhesive tape on which has been preprinted the desired indicia. Similar layers may be heat-fused or otherwise affixed as desired.

In one embodiment, a security document may conveniently be made in the following manner:

A 4 mil. (0.10 mm) thick sheet of $TiO_2$ pigmented 95 wt. % polyvinyl chloride—5 wt. % polyvinyl acetate is positioned adjacent an aligning magnetic field source such that appreciable flux from the field source extends through the sheet. A dispersion of 50 wt. % barium ferrite platelets (approximately 1 to 5 micrometers average diameter and a length to thickness ratio of approximately 7/1) blended with 50 wt. % thermosetting resin such as Adiprene L-167 (E. I. Dupont DeNemours, Inc. isocyanate terminated urethane prepolymer), diamine curing agent and an appropriate catalyst is cast onto the sheet to a thickness of about 23 mil. (0.58 mm) and allowed to cure in the presence of the aligning field, thereby forming a layer having a uniform dispersion of the barium ferrite platelets selectively aligned along the direction of the flux lines of the field. With a binder of sufficient viscosity it is not necessary to leave the coating in the presence of the field during the remainder of the curing step. Since no substantial forces causing disalignment are normally present, the particles will tend to remain as aligned. A typical cure time of 10 hours at 25°C is required before the casting is fully cured. After the cure is complete, a top pigmented layer may be applied by coating a dispersion of $TiO_2$ pigment in Adiprene L-167 onto the layer to a thickness of about ½ to 2 mil. (0.012 to 0.050 mm). Visible indicia may then be printed on either surface following which a 1 mil. (0.025 mm) transparent protective layer may be affixed to protect and prevent alteration of the printed indicia. The amount of barium ferrite in the layer may be as high as 85 wt. % while still allowing particle rotation to occur.

The record medium 10 preferably comprises a nonmagnetic backing 12 and a layer 14 having a uniform dispersion of magnetizable particles having magnetic anisotropy wherein the magnetizable particles within a plurality of selected locations 16 are differently aligned with respect to a reference location which may, for example, be along an edge 20 of the document 10. By uniformly dispersed, it is herein meant that the particle density, i.e. the number of particles per unit area is approximately constant throughout the layer even though the particles may be differently aligned at various locations. Double headed arrows such as within the selected locations 16 are used herein to designate the easy direction of magnetization produced by the alignment of the magnetizable particles. Anisotropic particles are readily magnetized in a direction parallel to their easy direction of magnetization and retain a higher level of remanent magnetization upon magnetization with a given applied field than is produced in a direction other than the easy direction with the same applied field. The background regions of the record medium 10 are preferably uniformly aligned to have the easy direction of magnetization normal to the plane of the record medium 10 as shown by double-headed arrows 22, and the easy direction of magnetization of the particles within the selected locations 16 is preferably normal to a long dimension of the record medium 10 such as the edge 20. The relative spacing between the selected locations 16 may be varied depending upon the desired application. In one embodiment, it is preferable that the selected locations be uniformly spaced along a track 18 parallel to the edge 20 such as is shown in FIG. 1.

FIG. 2 illustrates a system for authenticating a record medium 61 such as described hereinabove. An endless belt 63, driven at a uniform speed between rollers 60 and 62 by a drive means (not shown) carries the record medium 61 past guides (not shown) which prevent lateral movement of the record medium 61. A number of magnetic field generating or sensing devices 64, 66, 68 and 70, such as magnetic recording, erase and playback heads, are positioned with respect to the guides and belt such that predetermined tracks 72 and 74 on the document 61 pass by one or more an appropriate devices 64, 66, 68 or 70 when the document moves along the belt.

In one such system for authenticating a record medium 61, within which the permanent fixed information code pattern is represented by the spaced selected locations 73 along the track 72, each location of which contains particles which are differently aligned with respect to a reference location, the device 64 comprises a DC magnetic field generator such as a recording head to which DC current is supplied from a power source 76. Alternatively the device 64 may be an appropriately shaped and positioned permanent magnet. The device 64 produces a substantially unidirectional magnetic field having a major field component parallel to the track 72. As the record medium 61 passes adjacent the device 64 all portions of the track 72 are subjected to a constant intensity DC magnetic field which differently magnetizes the differently aligned particles within the track 72. This produces varying states of remanence in the particles depending upon the alignment of the particles. The device 66 comprises a magnetic recording playback head to detect the varying remanence along the track 72. Alternatively, Hall probes or like magnetic field sensors may be used. A signal representing each selected location 73 along track 72 is thus generated and fed to a signal processing network 78. A predetermined signal pattern is produced by the signal generator unit 79, and is compared with the processed fixed information signal pattern in the comparator unit 80 to authenticate the record medium 61.

Once the particles within the track 72 are magnetized, fixed information patterns represented by the spacing between, or the direction of alignment of the particles within the selected locations, can also be revealed apart from this system by the use of magnetic viewer devices. Such revelation may be inhibited by passing the record medium past an erase head 68 powered by an AC supply 81, which demagnetizes the particles within the track 72 thereby preventing any subsequent direct detection of the selected locations 73. The selected locations 73, of course, remain aligned, and can be repeatedly interrogated in the manner just described.

In a further embodiment, the record medium 61 may have other information recorded thereon according to conventional magnetic recording techniques. Track 74 is one such recording track. A magnetic playback head 70 is positioned to sense the recording on the track 74. Signals generated therein are fed to the information processing network 84. If desired, additional record and erase heads may similarly be provided. Likewise it should be appreciated that many parallel tracks across the record medium 61, various configurations of sensors, and other transport mechanisms may be employed.

In one embodiment for authenticating the record medium 61, the discrete selected locations 73 are uniformly spaced along the track 72. In another similar embodiment adjacent regions along the track are differently aligned in a cyclic pattern such as is disclosed in the above cross-referenced copending patent application of Richard E. Fayling and Douglas D. Campbell. In either embodiment, passage of the document 61 past the sensor 66 at a uniform velocity will result in the production of an alternating signal corresponding to the cyclic variation. The authenticity of the document 61 is verified if the frequency of the alternating signal is the same as that of a pre-set frequency produced by the signal generator unit 79, in like manner as that provided by common prior art devices for comparing a playback signal with a prerecorded signal.

Figures 3, 4A, 4B:
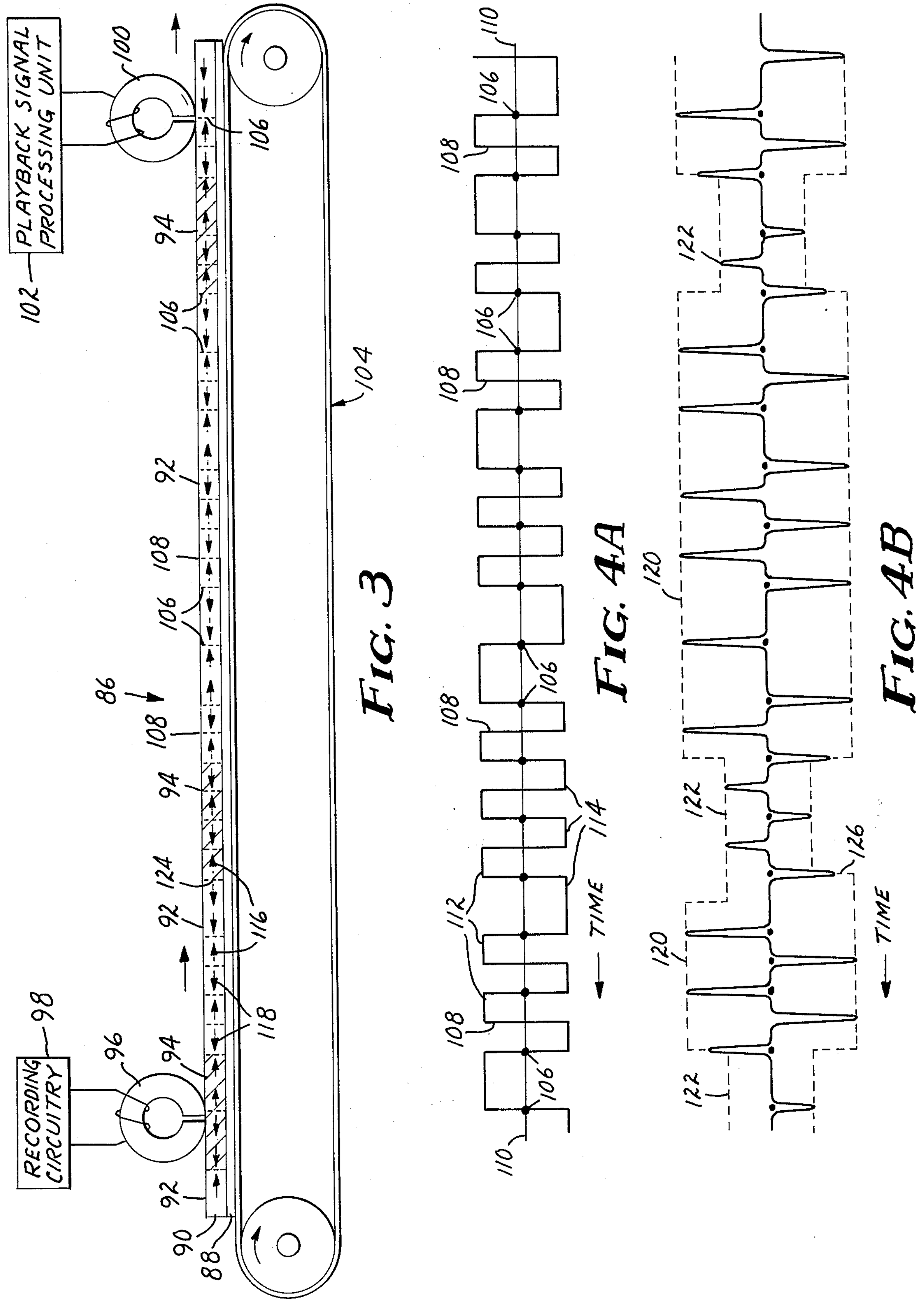
FIG. 3 is a cross-sectional schematic view of an information processing system with a record medium containing separate selectively magnetized and selectively aligned patterns.
FIG. 4A is an amplitude versus time plot of a composite signal magnetically recorded in superimposition with the selectively aligned pattern on the record medium shown in FIG. 3.
FIG. 4B is an amplitude versus time plot of an electric signal produced upon readout of the superimposed patterns shown in FIG. 3.

FIG. 3 is a schematic representation of an information processing system for use with a record medium 86 wherein two sets of information are superimposed on a single track. The record medium 86 comprises a backing 88 having a magnetizable layer 90 coated thereon, which layer contains magnetizable particles having magnetic anisotropy. In one embodiment, particles within selected locations 94 (shown as hatched areas) along a track on the layer 90 are aligned so that the easy direction of magnetization of the particles is in the plane of the layer 90, and transverse to the long dimension of the track, while particles in the remaining portions 92 of the track are aligned to provide an easy direction of magnetization parallel to the long direction of the track. A record medium containing such aligned particles is conveniently prepared in the manner disclosed in the above cross-referenced copending patent application of Richard E. Fayling and Douglas D. Campbell. The relative positions of the transversely aligned selected locations 94 of layer 90 represent a non-repetitive magnetically detectable permanent fixed information pattern, and may be in the form of digital bits.

Temporary information can be recorded on the same track using a standard technique such as two frequency coherent phase recording. Such a recording technique is a modification of IRIG (Inter Range Instrumentation Group, White Sands, New Mexico) NRZI recording, and provides clocking signal pulses superimposed on binary bit pulses, thereby providing built-in synchronization of both permanent and temporary signals. Referring to FIG. 3, a recording head 96 for recording such temporary information is driven by signals from the recording circuitry 98, which signals are in the form of reversing polarity DC currents. As shown in FIG. 4A, field reversals 106 corresponding to clock bits are produced at periodic time intervals while field reversals 108 corresponding to the "1" bits are produced during the interval of time between the clock bits. No current reversal during the interval of time between the clock bits corresponds to a "0" bit.

When the record medium 86 is moved by a transport mechanism 104 past the recording head 96, a sufficient field is produced by the head 96 along the direction of movement to magnetically saturate the particles in at least the portions 92 of the layer 90, i.e. where the particles are aligned to provide an easy direction of magnetization parallel to the long direction of the track and parallel to the major field component produced by the head 96. In contrast, the field produced by the head 96 is insufficient to magnetically saturate the particles within the regions corresponding to the selected locations 94 where the easy direction of magnetization is transverse to the long direction of the track. The resulting magnetic remanence along the track within the selected locations 94 is less than is the remanence in the remaining portions 92.

The permanent fixed information pattern is preferably encoded at a lower bit density than the temporary information. If desired, the dimension of the selected locations 94, the polarity of the current pulses, and the speed of the record medium during recording may be inter-related. For example, an integral number of clock bits per selected location will allow synchronization of the temporary recorded information. It will be recognized that any combination of digital or analog signals may similarly be superimposed in an analogous manner.

FIG. 4A shows the composite signal recorded on the security document 86 as a function of time, with the time axis increasing toward the left of the figure. FIGS. 3, 4A and 4B are shown in vertical registry to facilitate comparison of the composite signal and resultant field reversals (FIG. 4A), resultant magnetized areas in the record medium (FIG. 3), and readout signal (FIG. 4B). The periodic field reversals 106 are indicative of clocking pulses and are denoted as dots on the time axis of FIGS. 4A and 4B. Binary "1's" are denoted as 108 and are shown as a field reversal, while binary "0's", which in the NRZI convention is the absence of any signal change, are denoted as 110. When such a signal is recorded superimposed upon the permanently aligned selected locations along a track on the record medium 86, selectively magnetized areas will result. Thus the positive portions 112 of the pulse train shown in FIG.

4A magnetizes the portions of layer 90 in one direction as shown by the right facing arrows 116 in FIG. 3 and the negative portions 114 of the pulse train shown in FIG. 4A magnetizes the portions of layer 90 in the opposite direction as shown by the left facing arrows 118.

FIG. 4B illustrates the output signal induced in the magnetic read head 100 of FIG. 3 when the record medium 86 is moved by the transport mechanism 104 past the head 100, which signal is then coupled to the playback signal processing unit 102. While such playback may be done on the same equipment immediately following recording for purposes of verification, it will most often comprise a separate, subsequent operation, performed when the record medium 86 is presented for authentication or interrogation. The output signal is dependent upon the rate of change of flux present in the head 100 as a result of the motion of the record medium 86 past the head 100. Each reversal of magnetization will produce a positive or negative pulse depending upon the direction or sense of magnetization reversal. Where the alignment of the magnetizable particles is parallel to the direction of the track, and a maximum remanent signal is thus recorded, such as on portions 92 of layer 90, the maximum amplitude reproduced signals 120 will be produced. Similarly, where the magnetizable particles are aligned transverse to the direction of the track and a lower remanance signal is recorded, such as on the selected locations 94, reduced amplitude signals 122 will be produced. The envelope formed by the variations between the maximum and lesser responses may be recognized as corresponding to the permanent fixed information pattern, while the individual pulses and absence of pulses between the clock pulses are separately recognizable as the temporary digital information. It should be noted that when a magnetization reversal occurs at a transition between a parallel and transversely aligned region on layer 90 such as at 124 on layer 90, an intermediate level response will be obtained upon playback such as signal response 126 shown in FIG. 4B.

What is claimed is:

1. A system for authenticating a record medium having a magnetic recording layer containing uniformly dispersed magnetizable material having magnetic anisotropy wherein the magnetizable material at a plurality of selected locations is differently aligned from the alignment of the magnetizable material at a reference location to provide a magnetically detectable permanent fixed information pattern, which system comprises means for applying a substantially unidirectional magnetic field to said magnetic recording layer to magnetize said magnetizable material to different intensities depending upon the alignment thereof, means for sensing the magnetization of said differently magnetized material to produce a signal representative of said fixed information pattern, and means for comparing said produced signal with a predetermined signal pattern to authenticate the record medium.

2. A system according to claim 1, for authenticating a record medium wherein said selected locations are uniformly spaced, further comprising means for traversing the record medium with the sensing means at a uniform velocity to produce an alternating signal which corresponds to the spacing of the selected locations and the rate at which the selected locations are traversed; and wherein the comparing means is adapted for comparing the produced alternating signal with a reference signal of predetermined frequency to authenticate the record medium.

3. A system according to claim 1 further comprising means for demagnetizing said differently magnetized material to inhibit magnetic detection of the selected locations unless and until said unidirectional magnetic field is again applied to said magnetic recording layer.

4. An information processing system comprising:

a record medium having a magnetic recording layer for recording information for subsequent data reading, which layer contains uniformly dispersed magnetizable material having magnetic anisotropy wherein the magnetizable material at a plurality of selected locations is differently aligned from the alignment of material in the remainder of the layer to provide as representative of fixed information a magnetically detectable permanent pattern, means for recording a digital information signal in said layer to produce as representative of temporary information a pattern of remanently magnetized regions within the layer, wherein the remanence within each region is amplitude modulated by the magnetizable material alignment at said selected locations, and means for traversing said record medium and for sensing the magnetization pattern to provide an amplitude modulated digital signal in which the amplitude modulation component represents said fixed information and the digital component represents said temporary information.

* * * * *